United States Patent [19]

Briscoe et al.

[11] Patent Number: 4,602,173

[45] Date of Patent: Jul. 22, 1986

[54] MAGNETIC PROPULSION DEVICE

[76] Inventors: Reginald Briscoe; George Spector, both 233 Broadway Rm 3615, both of New York, N.Y. 10007

[21] Appl. No.: 657,353

[22] Filed: Oct. 3, 1984

[51] Int. Cl.[4] .......................... H02K 7/00; G09B 23/18
[52] U.S. Cl. ........................................ 310/1; 310/306; 310/66; 310/113; 310/83
[58] Field of Search .................... 310/1, 66, 157, 306, 310/113, 83

[56] References Cited

U.S. PATENT DOCUMENTS

| 1,019,544 | 3/1912 | South | 310/1 |
| 1,413,158 | 4/1922 | Caple | 310/113 X |
| 1,770,245 | 7/1930 | Titterington | 310/157 X |
| 1,932,816 | 10/1933 | Gargan et al. | 310/83 X |
| 1,959,251 | 5/1934 | Titterington | 310/66 X |
| 3,348,374 | 10/1967 | Schalkowsky | 310/306 X |

Primary Examiner—Donovan F. Duggan

[57] ABSTRACT

A generator that utilizes the magnetic flux lines of the earth and includes a base, a frame that is attached to the base, a shaft that has a free end and is rotatably mounted in the frame, components for rotating the shaft, a plurality of brushes that are mounted on the frame, at least one ring that is affixed to the free end of the shaft and which is in rotatable contact with the plurality of brushes, and an armature that is formed by coils of wire which are wound around a rod that is attached to the shaft, the coils of wire have free ends which are connected to at least one ring so that when the armature rotates the coils of wire cut the magnetic flux lines of the earth and cause an electric current to be generated at the plurality of brushes.

3 Claims, 2 Drawing Figures

MAGNETIC PROPULSION DEVICE

BACKGROUND OF THE INVENTION

The present invention relates to an electric generator. More particularly, it relates to an electric generator which has a base, a frame, an armature, a shaft for rotatably mounting the armature to the frame, components for rotating the armature, at least one ring and brushes for picking up the electric current generated.

Generators of the above mentioned general type are known in the art. An electric generator is a device in which mechanical power is converted into electrical power utilizing the principle that a voltage is induced in turns of a coil wire while the number of magnetic lines (the flux) linking the turns of the coil are changing. For example, in one type of electric generator, the coil is caused to rotate in a constant magnetic field. In another type of electric generator, the coil is kept stationary and the magnetic field is rotated. In the former arrangement the coil is formed by the armature windings on the rotor which revolves between the fixed magnetic poles of the stator. In the latter arrangement, the armature is stationary, and the magnetic poles (on a "magngtic wheel") revolve instead.

In both of the aforementioned general types of electric generators, the disadvantage present is that components are needed within the electric generator, pre se, to create the magnetic flux lines. Such a required construction increases the size and weight of the electric generator in addition to decreasing its ease of mobility.

SUMMARY OF THE INVENTION

Accordingly, it is an object of the present invention to provide an earth magnetic field generator which avoids the disadvantages of the prior art.

More particularly, it is an object of the present invention to provide an earth magnetic field generator which is easy to handle, portable, and does not contain components for producing magnetic flux lines.

In keeping with these objects, and with others which will become apparent hereinafter, one feature of the present invention resides, briefly stated, in a generator that utilizes the magnetic flux lines of the earth and includes a base, a frame which is attached to the base, a first shaft which has a free end which is rotatably mounted in the frame, components for rotating the first shaft, a plurality of brushes that are mounted on the frame, and at least one ring that is affixed to the free end of the first shaft and which is in rotatable contact with the plurality of brushes, wherein an armature is formed by coils of wire wound around a rod which is attached to the first shaft and the coils of wire have free ends which are connected to at least one ring so that when the armature rotates the coils of wire cut the magnetic flux lines of the earth and cause an electric current to be generated at the plurality of brushes.

When the earth magnetic field generator is designed in accordance with the present invention, an electric current is produced without the need for components to produce magnetic flux lines.

Still another feature of the present invention is that the rod of the armature is disposed substantially perpendicular to the first shaft.

A further feature of the present invention is that the rod of the armature rotates in a direction that is substantially parallel to the magnetic flux lines of the earth.

Yet another feature of the present invention is that at least one ring is a split ring.

Another feature of the present invention is that at least one ring is two split rings.

Still another feature of the present invention is that the components for rotating the first shaft include a motor disposed in the base.

Still yet another feature of the present invention is that the components for rotating the first shaft include a power source disposed in the base.

Yet still another feature of the present invention is that the components for rotating the first shaft include speed regulating components.

Still another feature of the present invention is that it further includes components for connecting the components rotating the first shaft, with the first shaft so that the motor shaft is affixed with a second gear which meshes with a fourth bevel gear which is affixed on the second end of an intermediate shaft which has affixed at its first end a third bevel gear which meshes with a first bevel gear which is affixed on the first shaft.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING FIGURES

FIG. 1 is an elevational view in partial cross section of the present invention; and FIG. 2 is an elevational view in partial cross section of an alternate embodiment of the present invention in which a radiometer is utilized for rotating the armature.

DETAILED DESCRIPTION OF THE PREFERRED EMBODIMENTS

Figure 1:
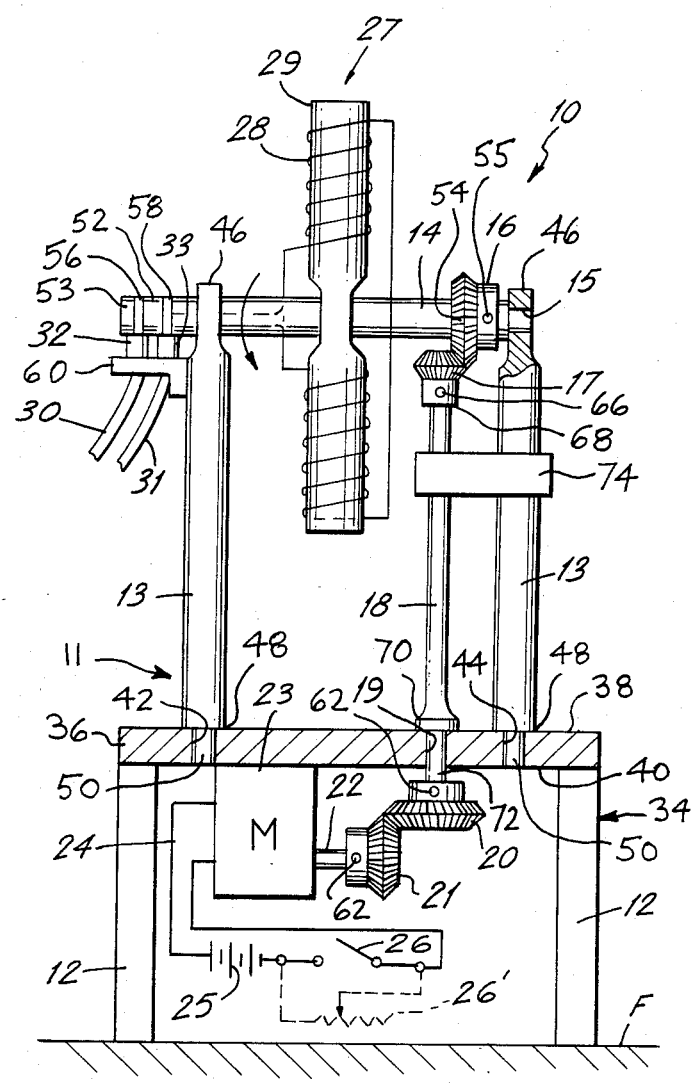

Referring now to FIG. 1, the earth magnetic field generator is shown generally at 10 and includes a rotating armature 27 and a stationary frame 11. The frame 11 is attached to a base 34 formed by a substantially horizontally disposed upper portion 36 having an upper face 38 and a lower face 40 and containing first, second and third substantially eccentrically disposed throughbores 42, 19 and 44 respectively. Substantially vertically disposed support blocks 12 complete the assembly of the base 34.

Disposed on the upper face 38 of the upper portion 36 of the base 34 are two substantially vertically disposed supports 13, each of which have a first end 46 and a second end 48. Formed at the second end 48 of each support 13 are first projections 50. The first projections 50 are received by the first and third throughbores 42 and 44 respectively of the upper portion 36 of the base 34 and provide or attachment of the supports 13 to the base 34.

Each of the first ends 46 of the supports 13 contain a fourth throughbore 15 which are inclined with each other and form journals for substantially cylindrically shaped horizontally disposed rotating armature shaft 14. The armature shaft 14 has a first end portion 52 and a second end portion 54. Disposed substantially perpendicular to the armature shaft 14 and intermediate the supports 13, is an armature rod 29 having coils of wire 28 wound around its surface. A first bevel gear 16 is fixedly attached by a set screw 55 to the armature shaft 14 in the vicinity of the second end portion 54. The second end portion 54 is rotatingly supported in the fourth throughbore 15 of one of the supports 13 while the first end portion 52 passes through and projects passed, with a projected portion 53, the fourth throughbore 15 of the other one of the supports 13. The projected portion 53 of the armature shaft 14 contains two slip rings 56 and 58 or may contain one split ring. Free ends of the coils of wire 28 of the armature 27 are connected to the two slip rings 56 and 58 or to the one split ring. The support 13 that is disposed adjacent the slip rings 56 and 58, has a ledge 60 projecting from its surface. The ledge 60 supports two brushes 32, perferably of carbon, that are in contact with the two rotating slip rings 56 and 58 or with the one split ring. Conductors 30 and 31 are attached to the brushes 32. The shaft 14 of the armature 27 is rotated by a motor 23. The motion of the motor 23 is transmitted to the armature shaft 14 by way of a connecting arrangement. The connecting arrangement includes a second bevel gear 21 fixedly attached, by a set screw 62, to a shaft 22 of the motor 23. A substantially vertically disposed intermediate shaft 18 has a first end 68 and a second substantially flared end 70. Fixedly attached by a set screw 66 to the first end 68 of the intermediate shaft 18 is a third bevel gear 17 which meshes with the first bevel gear 16 disposed on the armature shaft 14. Formed on the flared end 70 of the intermediate shaft 18 is a second projection 72 with a free end which passes through the throughbore 19 of the upper portion 36 of the base 34. The flared end 70 limits the vertical displacement of the intermediate shaft 18. Fixedly attached, by a set screw 64, to the free end of the projection 72 is a fourth bevel gear 20 which meshes with the second bevel gear 21. A support member 74, which is attached to the support 13 that is adjacent the first bevel gear 16, limits the horizontal displacement of the intermediate shaft 18 while providing a journal for its rotation.

The motor 23 is connected to a power source 25 through a switch 26. Alternatively to the switch 26, a speed control 26' such as a rheostat, may be employed if the angular velocity of the armature 27 is to be carried for purposes of varying the output of the generator 10. The motor 23, the power source 25, and the speed control 26' are disposed in the base 34.

Figure 2:
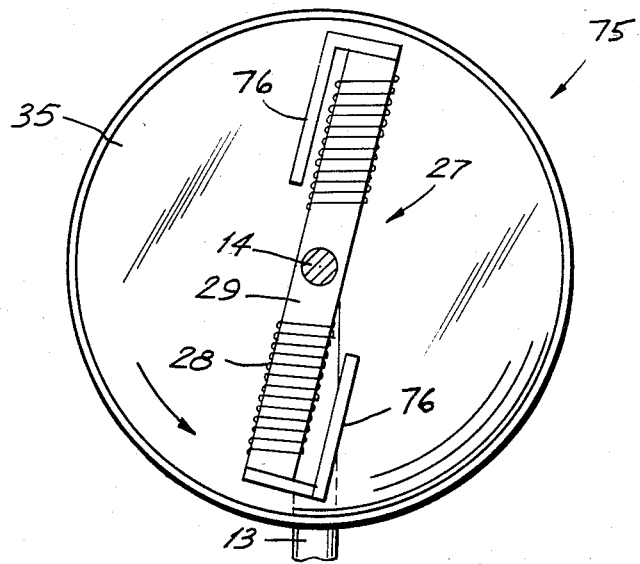

An alternate way of rotating the armature 26 is shown in FIG. 2. In this embodiment, a radiometer 75 is attached to the armature 27. Vanes 76 of the radiometer 75, blackend on one side and bright on the other, are attached to both ends of the armature rod 29. When rays from the sun or other light source fall on the vanes 76, the black sides are repelled more than the bright sides and the armature 27 is set into rotation. The more intense the rays, the more rapidly the armature 27 will rotate.

In operation, the generator 10 must be so positioned, that the armature rod 29 rotates in a north-south direction and the coils of wire 28 will therefore cut transversely through the magnetic flux lines of the earth causing an electric current to be generated at the bushes 32 and 33.

It will be understood that each of the elements described above, or two or more together, may find a useful application in other types of constructions differing from the types described above.

While the invention has been illustrated and described in an earth magnetic field generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A generator utilizing the magnetic flux lines of the earth, comprising:
   (a) a base;
   (b) a frame attached to said base;
   (c) a first shaft having a free end and being rotatably mounted in said frame;
   (d) means for rotating said first shaft;
   (e) a plurality of brushes mounted on said frame;
   (f) at least one ring affixed to said free end of said first shaft and being in rotatable contact with said plurality of brushes; and
   (g) an armature oriented rotably to cut the earth flux lines, formed by coils of wire wound around a rod mounted on said first shaft, said coils of wire having free ends connected to at least one ring so that when said armature rotates, said coils of wire cut the magnetic flux lines of the earth and cause an electric current to be generated at said plurality of brushes, wherein said rod is mounted perpendicular to said first shaft, wherein said means for rotating said first shaft includes a power source disposed in said base.

2. The generator as defined in claim 1, further comprising a means for connecting said means for rotating said first shaft to said first shaft and including first, second, third and fourth bevel gears, an intermediate shaft having first and second ends and a motor shaft, said motor shaft being affixed with said second bevel gear which meshes with said fourth bevel gear affixed on said second end of said intermediate shaft which has affixed at its first end said third bevel gear which meshes with said first bevel gear affixed on said first shaft.

3. The generator as in claim 1, wherein said means for rotating said first shaft includes a radiometer attached to said armature.

* * * * *